(12) United States Patent
Hayashi et al.

(10) Patent No.: US 6,977,232 B2
(45) Date of Patent: Dec. 20, 2005

(54) OPTICAL GLASS, PREFORM FOR PRESS MOLDING AND OPTICAL PART

(75) Inventors: Kazutaka Hayashi, Tokyo (JP); Xuelu Zou, Tokyo (JP)

(73) Assignee: Hoya Corporation, Tokyo (JP)

(*) Notice: Subject to any disclaimer, the term of this patent is extended or adjusted under 35 U.S.C. 154(b) by 117 days.

(21) Appl. No.: 10/270,720

(22) Filed: Oct. 16, 2002

(65) Prior Publication Data

US 2003/0100433 A1 May 29, 2003

(30) Foreign Application Priority Data

Oct. 24, 2001 (JP) .......................................... 2001-325861

(51) Int. Cl.⁷ .......................... C03C 3/066; C03C 3/155; C03C 3/095
(52) U.S. Cl. .............................. 501/79; 501/51; 501/50; 501/64
(58) Field of Search ............................. 501/50, 51, 64, 501/65, 77–79, 901, 903

(56) References Cited

U.S. PATENT DOCUMENTS

| | | | | |
|---|---|---|---|---|
| 3,811,901 A | * | 5/1974 | Bacon | 501/38 |
| 4,111,707 A | * | 9/1978 | Komorita et al. | 501/78 |
| 4,226,627 A | * | 10/1980 | Inoue et al. | 501/50 |
| 4,732,876 A | * | 3/1988 | Nagamine et al. | 501/78 |
| 4,742,028 A | * | 5/1988 | Boudot et al. | 501/78 |
| 6,251,813 B1 | * | 6/2001 | Sato | 501/78 |
| 6,558,316 B2 | * | 5/2003 | Kikuchi et al. | 600/133 |
| 6,645,894 B2 | * | 11/2003 | Endo | 501/51 |
| 2003/0050177 A1 | * | 3/2003 | Uehara | 501/78 |
| 2003/0125186 A1 | * | 7/2003 | Hayashi et al. | 501/50 |

FOREIGN PATENT DOCUMENTS

| | | | | |
|---|---|---|---|---|
| JP | 62100449 A | * | 5/1987 | ........... C03C/3/064 |
| JP | 06-305769 | | 11/1994 | |

OTHER PUBLICATIONS

Derwent Abstract 1987–167506 of JP 62–100449.*

* cited by examiner

*Primary Examiner*—Karl Group
*Assistant Examiner*—Elizabeth A. Bolden
(74) *Attorney, Agent, or Firm*—Nixon & Vanderhye P.C.

(57) ABSTRACT

Provided is an optical glass that has high-refractivity and high-dispersion properties and can give preforms for press-molding, which are excellent in shapability at high temperatures and suitable for precision press-molding.

The optical contains, as essential components, 25 to 45 mol % of $B_2O_3$, 2 to 20 mol % of $SiO_2$, 5 to 22 mol % of $La_2O_3$, 2 to 20 mol % of $Gd_2O_3$, 15 to 29 mol % of ZnO, 1 to 10 mol % of $Li_2O$ and 0.5 to 8 mol % of $ZrO_2$, the optical glass having a $B_2O_3/SiO_2$ molar ratio of from 2 to 5.5 and having an $La_2O_3$ and $Gd_2O_3$ total content of 12 to 24 mol % and a ZnO and $Li_2O$ total content of 25 to 30 mol %, the optical glass having a refractive index (nd) of 1.75 to 1.85 and an Abbe's number (vd) of 40 to 55, or the optical glass contains, as essential components, $B_2O_3$, $SiO_2$, $La_2O_3$, $Gd_2O_3$, ZnO, $Li_2O$ and $ZrO_2$ and has a viscosity of at least 6 dPa·s at a liquidus temperature thereof, a glass transition temperature (Tg) of 600° C. or lower, a refractive index (nd) of 1.75 to 1.85 and Abbe's number (vd) of 40 to 55.

8 Claims, 1 Drawing Sheet

FIG.1

OPTICAL GLASS, PREFORM FOR PRESS MOLDING AND OPTICAL PART

BACKGROUND OF THE INVENTION

1. Field of the Invention

The present invention relates to an optical glass, a preform for press-molding, a method for the preparation of a preform for press-molding, an optical part and a process for the production of an optical part. More specifically, the present invention relates to an optical glass having a $B_2O_3$—$SiO_2$—$La_2O_3$—$Gd_2O_3$—ZnO—$Li_2O$ composition, having a viscosity property with which a preform for press-molding is hot-shapable, having optical constants such as a refractive index (nd) of 1.75 to 1.85 and an Abbe's number (vd) in the range of from 40 to 55, having a low transition temperature imparted and having suitability to mold-shaping, a press-molding preform made of the above optical glass; a method for efficiently preparing the above preform; an optical part made of the above optical glass; and a process for producing an optical part from the above press-molding preform.

2. Prior Art of the Invention

In recent years digital cameras have come to be popular, and the integration degree and functions of machines and equipment used for optical systems are rapidly increased. Under the circumstances, it is increasingly demanded to attain the higher accuracy of optical systems and decrease the optical systems in weight and size. For materializing such demands, optical designing using an aspherical lens is coming to constitute a main stream. For stably supplying a large amount of spherical lenses made of high-function glass at a low cost, therefore, attention is paid to a molding technique for directly forming an optical surface by press-molding without any cutting and polishing steps. Demands for an optical glass having high-functions (e.g., high refractivity—low dispersion; high refractivity—high dispersion) and having suitability to mold-shaping are increasing year after year.

Conventionally, glasses containing $B_2O_3$, $La_2O_3$, etc., as essential components are known as an optical glass having optical constants of a high refractive index (nd≧1.75) and low-dispersion (vd≧40). In these glasses, however, priority has been given to improvements in chemical durability, devitrification resistance against heat and hot shapability, and the high-temperature moldability required for hot press-molding of a glass gob preform has not been fully taken account of. Particularly, no high-refractivity low-dispersion optical glass having a refractive index of nd≧1.75 and an Abbe's number of vd≧45 is suitable for molding a gob preform, which is an obstacle for mass-producing aspherical lenses by precision press-molding. The reason therefor is as follows. Since the above glass generally has a high liquidus temperature or a low viscosity at high temperatures, the high-temperature moldability of a gob preform is deteriorated, and it is difficult to prepare gob preform having high accuracy.

Precision press-molding of a glass is a method in which a glass preform (gob preform) is molded under pressure at a high temperature with a mold having a cavity having a predetermined form, to obtain a glass molded article having a form of an end product or a form very close thereto. According to the precision press molding, molded articles having a desired form can be mass-produced at high productivity. For this reason, various optical glass products such as a spherical lens, an aspherical lens, a diffraction grating, etc., are produced by precision press-molding these days.

For obtaining an optical glass product by precision press-molding, naturally, it is required to press-mold a glass preform at a high temperature as described above, so that a mold for the pressing is exposed to high temperatures and that high pressures are applied thereto. From the viewpoint of suppressing damage caused on a mold itself and a mold release film provided on an inner surface of the mold, under an high-temperature environment for the press-molding, therefore, it is desired to decrease the glass transition temperature (Tg) and the sag temperature (Ts) of a gob preform for glass molding. When a glass preform for precision press-molding is prepared by hot shaping, a glass having a high liquidus temperature (LT) is liable to devitrify, and such a glass is poor for mass-productivity, so that it is desirable to decrease the LT of the glass. For preparing precision-press-molding preforms accurately and uniformly by hot shaping, further, the high-temperature viscosity of a glass at its liquidus temperature is required to be at least 6 dPa·s.

Conventional optical glass, particularly, an optical glass for precision press-molding, has a liquidus temperature of far greater than 1,000° C. when it has a refractive index (nd)>1.75 and an Abbe's number (vd)>40. Such a glass is poor in thermal stability and is liable to devitrify when a gob preform is molded. Such a glass is therefore poor in mass-productivity, and it is difficult to prepare glass gob preform for press-molding, therefrom accurately and uniformly.

SUMMARY OF THE INVENTION

Under the circumstances, the present invention seeks to provide an optical glass having high-refractivity and low-dispersion optical constants, having a high-temperature viscosity that efficiently permits mass-production of preforms for press-molding, and having a low transition temperature and a low liquidus temperature; a press-molding preform made of the above optical glass; a method for the preparation thereof; an optical part made of the above optical glass; and a method for efficiently mass-producing such optical parts.

For achieving the above object, the present inventors have made diligent studies and as a result have found that an optical glass having a specific glass composition and having a refractive index and an Abbe's number in specific ranges or an optical glass containing specific essential components and having a specific high-temperature viscosity, a specific glass transition temperature, a specific refractive index and a specific Abbe's number efficiently gives preforms for press-molding in mass-production; that preforms for press-molding can be efficiently prepared by subjecting the above optical glass to a specific process; and that optical parts having a desired form can be efficiently produced in mass production by heating, softening and precision press-molding the above preforms for press-molding. The present invention has bee completed on the basis of the above finding.

That is, the present invention provides, (1) an optical glass comprising, as essential components, 25 to 45 mol % of $B_2O_3$, 2 to 20 mol % of $SiO_2$, 5 to 22 mol % of $La_2O_3$, 2 to 20 mol % of $Gd_2O_3$, 15 to 29 mol % of ZnO, 1 to 10 mol % of $Li_2O$ and 0.5 to 8 mol % of $ZrO_2$, the optical glass having a $B_2O_3/SiO_2$ molar ratio of from 2 to 5.5 and having an $La_2O_3$ and $Gd_2o_3$ total content of 12 to 24 mol % and a ZnO and $Li_2O$ total content of 25 to 30 mol %, the optical glass having a refractive index (nd) of 1.75 to 1.85 and an Abbe's number (vd) of 40 to 55 (to be referred to as "optical glass I" hereinafter), (2) an optical glass according to the above (1), which contains, as optional components, 0 to 8 mol % of $Ta_2O5$, 0 to 8 mol % of $WO_3$, 0 to 8 mol % of $Nb_2O5$, 0 to 8 mol % of $Y_2O_3$, 0 to 8 mol % of $Yb_2o_3$ and 0 to 1 mol % of $Sb_2O_3$, the essential components and the optional components having a total content of at least 95 mol %, (3) an optical glass according to the above (1) or (2), which has a viscosity of at least 6 dPa·s at a liquidus temperature thereof, (4) an optical glass according to the above (1), (2) or (3), which has a glass transition temperature (Tg) of 600° C. or lower, (5) an optical glass comprising, as essential components, $B_2O_3$, $SiO_2$, $La_2O_3$, $Gd_2O_3$, ZnO, $Li_2O$ and $ZrO_2$ and having a viscosity of at least 6 dPa·s at a liquidus temperature thereof, a glass transition temperature (Tg) of 600° C. or lower, a refractive index (nd) of 1.75 to 1.85 and Abbe's number (vd) of 40 to 55 (to be referred to as "optical glass II" hereinafter), (6) an optical glass according to the above (5), wherein the $B_2O_3/SiO_2$ molar ratio of from 2 to 5.5, (7) the optical glass according to the above (5) or (6), wherein the $La_2O_3$ and $Gd_2O_3$ total content is 12 to 24 mol % and the ZnO and $Li_2O$ total content is 25 to 30 mol %, (8) a preform for press-molding, which is a preform for press-molding by heating and softening and is formed of the optical glass recited in any one of the above (1) to (7), (9) a method for the preparation of a preform for press-molding by heating and softening, which comprises flowing out of a flow pipe, a predetermined amount of a molten glass of the optical glass recited in any one of the above (1) to (7); shaping the molten glass during a softened state to the form of a preform; and cooling the shaped glass, (10) an optical part made of the optical glass recited in any one of the above (1) to (7), and (11) a method for the production of an optical part, which comprises heating, softening and precision press-molding the preform recited in the above (8) or a preform prepared by the method recited in the above (9).

PREFERRED EMBODIMENTS OF THE INVENTION

In the present specification, the "precision press-molding of glass" means a method in which a re-heated press-molding preform (preform for press-molding or gob preform) is press-molded with a mold having a cavity of a predetermined form, to obtain a glass molded article having an end product form or a form very close thereto and surface accuracy. The "hot shaping of a preform for press-molding" means a method in which a molten glass (glass melt) is shaped to a form of a preform while the glass is during a softened state.

According to the precision press-molding, molded articles having a desired form can be produced efficiently at high productivity. At present, therefore, various optical products made of glass such as a spherical lens, an aspherical lens, a diffraction grating, etc., are produced by precision press-molding. In the precision press-molding, a mold used for pressing is exposed to a high-temperature and high-pressure state. For the above reason, for suppressing damage that is to be caused on the mold itself and a mold release film provided on the molding surface of the mold by a high-temperature environment during the press-molding, it is desired to decrease the glass in glass transition temperature (Tg) and sag temperature (Ts) so as to make them as low as possible.

The optical glass of the present invention for satisfying the above requirement includes two embodiments, that is, the optical glass I and the optical glass II.

First, the optical glass I will be explained below.

The optical glass I of the present invention refers to an optical glass containing, as essential components, 25 to 45 mol % of $B_2O_3$, 2 to 20 mol % of $SiO_2$, 5 to 22 mol % of $La_2O_3$, 2 to 20 mol % of $Gd_2O_3$, 15 to 29 mol % of ZnO, 1 to 10 mol % of $Li_2O$ and 0.5 to 8 mol % of $ZrO_2$, having a $B_2O3/SiO_2$ molar ratio of from 2 to 5.5, having an $La_2O_3$ and $Gd_2o_3$ total content of 12 to 24 mol % and a ZnO and $Li_2O$ total content of 25 to 30 mol %, and having a refractive index (nd) of 1.75 to 1.85 and an Abbe's number (vd) of 40 to 55.

The above optical glass I is preferably an optical glass containing, as optional components, 0 to 8 mol % of $Ta_2O_5$, 0 to 8 mol % of $WO_3$, 0 to 8 mol % of $Nb_2O_5$, 0 to 8 mol % of $Y_2O_3$, 0 to 8 mol % of $Yb_2O_3$ and 0 to 1 mol % of $Sb_2O_3$, wherein the total content of the essential components and the optional components is at least 95 mol %. Further, the above optical glass is suitable when it has a viscosity of at least 6 dPa's at a liquidus temperature thereof and a glass transition temperature (Tg) of at least 600° C.

It will be explained below why the physical properties and the glass composition of the optical glass I having precision press-moldability and having high refractivity and high dispersion properties are determined as described above.

First, the viscosity at a liquidus temperature will be discussed. When a preform for press-molding is hot shaped, particularly, when a preform for precision press-molding is prepared by a droplet floating method (to be described later), the viscosity of the glass at a working temperature is strictly defined, as will also be the case in the optical glass II to be described later. Experimental results show the viscosity at a working temperature is essentially required to be at least 6 dPa·s, it is preferably at least 6.5 dPa·s, more preferably at least 9 to 25 dPa·s, particularly preferably 10 to 25 dPa·s. When the viscosity of 6 dPa·s at a liquidus temperature of a glass is not attained, and if the viscosity is increased by decreasing the working temperature, the temperature of a melt comes to be lower than the liquidus temperature, so that the glass devitrifies. In a worst case, a flow pipe for flowing out a molten glass may be clogged. The viscosity of the optical glass I at a liquidus temperature thereof is essentially required to be at least 6 dPa·s.

The above amount ranges of the glass composition have been determined on the basis of chemical experiments, and reasons for limitations imposed on the contents of components are as follows. Each content (%) stands for mol %.

$B_2O_3$ is an oxide for forming a glass network structure and is an essential component in the present invention. Particularly, when a large amount of high-refractivity components such as $La_2O_3$, $Gd_2O_3$, etc., are introduced, more $B_2O_3$ is required than $SiO_2$ for maintaining the stability of the glass. When the content of $B_2O_3$ is over 45%, the refractive index of the glass decreases. When the content of $B_2O_3$ is smaller than 25%, the stability of the glass against devitrification is insufficient. The content of $B_2O_3$ is therefore limited to the range of from 25 to 45%, and the content thereof is preferably in the range of from 30 to 44%.

$SiO_2$ is a component for forming a glass network structure like $B_2O_3$, and when a small amount of $SiO_2$ is added in place of part of $B_2O_3$ that is a main component, the liquidus temperature of the glass is decreased, and the glass is improved in high-temperature viscosity. When the content of $SiO_2$ is less than 2%, the above effect is insufficient. When the content of $SiO_2$ is over 20%, the refractive index of the glass decreases, and the sag temperature of the glass increases, so that both preparation of a preform and precision press-molding are difficult. The content of SiO2 is therefore limited to the range of from 2 to 20%. The content thereof is preferably in the range of from 3 to 15%.

Further, since the glass composition in the present invention contains a large amount of $Li_2O$ and ZnO as components for attaining a lower glass transition temperature, the content of $B_2O_3$ is limited to 45% or less for attaining desired optical constants. For improving the glass in stability against devitrification, therefore, it is required to incorporate a relatively large amount of $SiO_2$. As an index for the content of $SiO_2$, the $B_2O_3/SiO_2$ molar ratio between $B_2O_3$ as a similar network-forming oxide and $SiO_2$ can be determined. When the above ratio is too large, that is, when the relative content of $SiO_2$ is too small, the glass is poor in stability, and the viscosity of the glass at a liquidus temperature thereof also comes to be insufficient. Therefore, the $B_2O_3/SiO_2$ molar ratio is limited to 5.5 or less, more preferably to 5 or less. When the $B_2O_3/SiO_2$ molar ratio is too small, the decrease of the refractive index or the increase of the glass transition temperature is caused, so that the $B_2O_3/SiO_2$ molar ratio is limited to at least 2. Therefore, the $B_2O_3/SiO_2$ molar ratio is determined to be 2 to 5.5, and it is preferably 2 to 5.

$La_2O_3$ is an essential component for increasing the refractive index and improving the glass in chemical durability without decreasing the stability of the glass against devitrification and further without increasing the dispersion. However, when the content of $La_2O_3$ is less than 5%, no sufficient effects can be obtained. When the content thereof exceeds 22%, the stability of the glass against devitrification is deteriorated to a great extent, and both the glass transition temperature and the sag temperature increase, so that the preparation of a gob preform and precision press-molding are caused to be difficult. The content of $La_2O_3$ is therefore limited to the range of from 5 to 22%, and it is preferably in the range of from 7 to 20%.

Like $La_2O_3$, $Gd_2O_3$ works to improve the glass in refractive index and chemical durability without deteriorating the stability of the glass against devitrification and the low dispersion property. When the content of $Gd_2O_3$ is less than 2%, no sufficient effects can be obtained. When the content thereof exceeds 20%, the stability against devitrification is deteriorated, and the glass transition temperature and the sag temperature increase, so that the preparation of a gob preform and the precision press-molding are caused to be difficult. Therefore, the content of $Gd_2O_3$ is limited to the range of from 2 to 20%, and it is preferably in the range of from 4 to 15%. For maintaining high functionality of high-refractivity (nd>1.75) and low dispersion (vd>40) in a $B_2O_3$—$La_2O_3$ ($Gd_2O_3$)—ZnO—$Li_2O$ glass, generally, the total content of $La_2O_3$ and $Gd_2O_3$ is required to be at least 12% (over 35% by weight). For decreasing the glass transition temperature and the sag temperature of a glass containing such a large amount of $La_2O_3$ or $Gd_2O_3$, it is required to introduce alkali components such as $Li_2O$, $Na_2O$ and $K_2O$. For offsetting a decrease of the refractive index caused by the introduction of the alkali oxide, it is required to further increase the content of $La_2O_3$ or $Gd_2O_3$. However, with an increase in the content of $La_2O_3$ and $Gd_2O_3$ and the content of the alkali, the glass stability is deteriorated, and the liquidus temperature increases, so that the viscosity of the glass at a liquidus temperature thereof is liable to decrease. Particularly, when the total content of $La_2O_3$ and $Gd_2O_3$ exceeds 24%, the tendency toward devitrification in the glass is considerably intensified, and the viscosity of the glass in a liquidus temperature thereof is considerably low, so that the preparation of a gob preform may be no longer possible. It is therefore required to limit the total content of $La_2O_3$ and $Gd_2O_3$ to 24% or less, and the total content thereof is preferably in the range of from 14 to 23%.

$ZrO_2$ is used as a component for high refractivity. When a small amount of $ZrO_2$ is introduced in place of part of $La_2O_3$ and $Gd_2O_3$, $ZrO_2$ has an effect on improving the glass in high-temperature viscosity and stability against devitrification without decreasing the refractive index of the glass and without increasing the dispersion, so that a small amount of $ZrO_2$ is introduced in the present invention. When the content of $ZrO_2$ is less than 0.5%, no effect produced by the introduction of $ZrO_2$ is observed. When the content thereof exceeds 8%, the liquidus temperature sharply increases, and the stability against devitrification is deteriorated. Therefore, the content of $ZrO_2$ is limited to the range of from 0.5 to 8%, and it is preferably in the range of from 1 to 6%.

ZnO is an essential component that decreases the melting temperature, the liquidus temperature and the glass transition temperature of the glass and is indispensable for adjusting the refractive index. When the content of ZnO is less than 15%, the above effects expected cannot be obtained. When the content thereof exceeds 29%, the dispersion is increased, the stability against devitrification is deteriorated, and the chemical durability is decreased. Therefore, the content of Zno is limited to the range of from 15 to 29%, and it is preferably in the range of from 17 to 28%.

$Li_2O$ is a component for decreasing the glass transition temperature to a great extent as compared with any other alkali oxide component without much decreasing the refractive index and the chemical durability. Particularly, when a small amount of $Li_2O$ is introduced, the effect thereof is large, and it is a component effective for adjusting the thermal properties of the glass. When the content of $Li_2O$ is less than 1%, the effect thereof is small. When the content thereof is greater than 10%, the stability of the glass against devitrification sharply decreases, and the liquidus temperature of the glass also increases. Therefore, the content of $Li_2O$ is limited to the range of from 1 to 10%, and it is preferably in the range of from 2 to 8%.

The total content of ZnO and $Li_2O$ is determined to be 25 to 30%. When the above total content is less than 25%, it is insufficient to decrease the glass transition temperature (Tg). When it exceeds 30%, the viscosity of the glass at a liquidus temperature thereof decreases. For compatibilizing the lower glass transition temperature and the high-temperature viscosity condition that is to be taken account of for hot-moldability of a preform, the total content of ZnO and $Li_2O$ is determined to be 25 to 30%.

Of glass compositions in the above ranges, the glass still more preferably has the following composition.

| | |
|---|---|
| $B_2O_3$ | 30–44% |
| $SiO_2$ | 3–15% |
| $B_2O_3/SiO_2$ molar ratio | 2–5 |
| $La_2O_3$ | 7–20% |
| $Gd_2O_3$ | 4–15% |
| $La_2O_3$ + $Gd_2O_3$ | 14–23% |

-continued

| | |
|---|---|
| $ZrO_2$ | 1–6% |
| $ZnO$ | 17–28 % |
| $Li_2O$ | 2–8% |
| $ZnO + Li_2O$ | 25–30% |

In the optical glass I of the present invention, further, $Ta_2O_5$, $WO_3$, $Nb_2O_5$, $Y_2O_3$ and $Yb_2O_3$ are all optional components for improving the glass in stability and refractive index. When the content of each exceeds 8%, not only the dispersion increases, but also the stability against devitrification is deteriorated, so that the content of each of them is limited to 8% or less. The content of each is preferably 5% or less. Of $Ta_2O_5$, $WO_3$, $Nb_2O_5$, $Y_2O_3$ and $Yb_2O_3$, $Ta_2O_5$ is the most preferred from the above viewpoint. It is preferred to incorporate 0.5 to 8% of $Ta_2O_5$, and it is more preferred to incorporate 1 to 8% thereof. For adjusting the Abbe's number (vd) to the range of from 40 to 55 without impairing the desired properties, the content of one of $Nb_2O_5$ and $WO_3$ is desirably zero, and the content of each of $Nb_2O_5$ and $WO_3$ is more desirably zero.

On the other hand, $WO_3$ has an effect on decreasing the liquidus temperature when added in place of other high-refractivity component. For decreasing the liquidus temperature while maintaining a high refractive index so as to improve the hot shapability of a preform, it is preferred to incorporate 0 to 3% of $WO_3$, it is more preferred to incorporate 0 to 2% of $WO_3$, and it is still more preferred to incorporate 0 to 1% of $WO_3$.

$Y_2O_3$ and $Yb_2O_3$ are used as components for a high refractive index and low dispersion, and they increase the refractive index of the glass and improve the glass in chemical durability when added in a small amount. The above effects thereof are small as compared with $La_2O_3$ and $Gd_2O_3$. When the content of each of $Y_2O_3$ and $Yb_2O_3$ exceeds 8%, they have defects that the stability of the glass against devitrification is impaired to a great extent, and that the glass transition temperature and the sag temperature are increased. The content of each of them is therefore limited to 8% or less, and it is preferably 7% or less.

$Sb_2O_3$ is an optional component as an anti-foaming agent. A sufficient effect can be produced when the content thereof is 1% or less. The content thereof is therefore limited to 1% or less.

In the optical glass I of the present invention, preferably, the total content of the above components is at least 95% for maintaining the optical properties and stability. Further, the optical glass I may contain other components such as $Na_2O$, $K_2O$, $CaO$, $SrO$, $BaO$, $Al_2O_3$ and $TiO_2$ as required.

Preferably, the optical glass I does not contain any lead component. The lead component causes detrimental effects on environments due to its toxicity, and it is easily reduced during press-molding in a non-oxidizing atmosphere and precipitates as a metal. The optical glass I preferably contains no fluorine component. The fluorine component makes it difficult to mold a preform at a high temperature.

In the optical glass I, the total content of $B_2O_3$, $SiO_2$, $La_2O_3$, $Gd_2O_3$, $ZnO$, $Li_2O$, $ZrO_2$ and $Ta_2O_5$ is preferably at least 95%, more preferably at least 99%, and particularly preferably 100%. In these cases, the content of each component is in the range as defined above.

The optical glass I preferably has a glass transition temperature (Tg) of 600° C. or lower, which is a property suitable for press-molding, particularly, precision press-molding. When the glass transition temperature (Tg) exceeds 600° C., a mold per se or a mold release film provided on a molding surface of the mold may be damaged during press-molding. The lower limit of the glass transition temperature (Tg) is not specially limited, while it is generally 400° C. or higher.

The optical glass II will be explained hereinafter.

The optical glass II is an optical glass that contains, as essential components, $B_2O_3$, $SiO_2$, $La_2O_3$, $Gd_2O_3$, $ZnO$, $Li_2O$ and $ZrO_2$ and is excellent in precision press-moldability, hot shapability of a preform, high refractivity and low-dispersion properties and glass stability. The optical glass II has a refractive index (nd) in the range of from 1.75 to 1.85 and Abbe's number (vd) in the range of from 40 to 55, and has a glass transition temperature (Tg) of 600° C. or lower and a viscosity of at least 6 dPa·s at a liquidus temperature thereof.

For attaining desired optical constants, a sag temperature, a viscosity at a liquidus temperature and glass stability as desired, the optical glass II preferably has a $B_2O_3/SiO_2$ molar ratio of from 2 to 5.5, and/or the optical glass II preferably has an $La_2O_3$ and $Gd_2O_3$ total content of 12 to 24 mol % and a $ZnO$ and $Li_2O$ total content of 25 to 30 mol %.

The viscosity of the optical glass II at a liquidus temperature thereof is determined for the same reason as that in the optical glass I, and the above viscosity is at least 6 dPa·s, preferably at least 6.5 dPa·s, more preferably 9 to 25 dPa·s, particularly preferably 10 to 25 dPa·s.

In the optical glass II, for adjusting the Abbe's number (vd) to the range of from 40 to 55 without impairing the desired properties, similarly, the content of one of $Nb_2O_5$ and $WO_3$ is desirably zero, and the content of each of $Nb_2O_5$ and $WO_3$ is more desirably zero. In the optical glass II, similarly, it is preferred to incorporate $Ta_2O_5$.

The optical glass II preferably has a glass transition temperature (Tg) of 600° C. or lower, which is a property suitable for press-molding, particularly, precision press-molding. When the glass transition temperature (Tg) exceeds 600° C., a mold per se or a mold release film provided on a molding surface of the mold may be damaged during press-molding. The lower limit of the glass transition temperature (Tg) is not specially limited, while it is generally 400° C. or higher.

The optical glasses I and II are transparent in visible light region and are suitable as materials for optical parts such as a lens.

Embodiments of the preform for press-molding and the method for the preparation thereof will be explained below.

The hot shaping of a preform for press-molding refers, for example, to a method in which a homogeneous foam-free molten glass is prepared by the steps of melting, clarification and stirring, and the molten glass is shaped into the form of a preform. Specifically, the above molten glass is allowed to flow out of a pipe outlet, and when a molten glass that has flowed out comes to have a predetermined amount, a forward end portion of the molten glass is separated, or the molten glass is cut and separated. The thus-obtained glass is shaped into a preform and the so-shaped molten glass is cooled to obtain a preform. The method of separating the forward end portion of the molten glass that has flowed out includes a method in which the molten glass is dropped from a pipe outlet (dropping method) and a method in which the forward end portion of the molten glass is held on a support and the support is moved downward at a higher rate than a rate at which the molten glass flows out (drop-cutting method). The pipe for flowing out the molten glass is preferably a pipe made of platinum or a platinum alloy. For allowing the molten glass to flow out of the pipe and hot-shaping a preform as described above, it is required to allow the molten glass to smoothly flow out of the pipe, it is required to separate a predetermined amount of the glass by the above separation method, the glass is required not to devitrify at a temperature at which the molten glass flows out, and the temperature at which the glass flows out is required to be lower than the temperature against which the above pipe has durability. As a condition for satisfying the above requirements, preferably, the viscosity of the glass at a liquidus temperature thereof is brought to the predetermined range as has been already explained with respect to the properties of the optical glasses I and II. Further, since a pipe made of platinum or a platinum alloy has a heat-resistant temperature of approximately 1,100° C., the viscosity of the glass at 1,100° C. is preferably 4 Pa·s or less.

The preform for press-molding, provided by the present invention, is formed of the above optical glass I or II. As a method for efficiently preparing press-molding preforms having high weight accuracy at high productivity, a method of hot-shaping a molten glass or a glass in a softened state into preforms is excellent. As a method for the preparation of the preform of the present invention, there is employed a method in which a glass material that can give the above optical glass I or II is melted, clarified and stirred to prepare a uniform molten glass, the molten glass is allowed to flow out of a pipe made of platinum or a platinum alloy, to prepare a glass gob made of a predetermined amount of the molten glass, and the glass gob is shaped into a preform. In the above method, a molten glass is allowed to continuously flow out of an outlet of the above pipe, a forward end portion of the glass that has flowed out of the outlet is separated to obtain a predetermined amount of a glass gob, and the glass gob is shaped into the form of a preform while the glass is in a temperature range in which the glass is plastic deformable. The method of separating the forward end portion of the glass that has flowed out includes a dropping method and a drop-cutting method as explained above. In any method, cutting with a machine is undesirable since a cut portion formed by the machine such as a cutting machine remains as a mark on a preform and deteriorates a precision press-molded article in quality. When the above optical glass is used, a forward end portion of the glass that has flowed out of the pipe outlet can be separated without cutting with a machine while preventing the glass from devitrifying. When the speed and the temperature at which the glass flows out are maintained at constant levels, and when the dropping condition or the downward moving condition is maintained at a constant level, preforms having a constant amount each can be prepared highly accurately with good reproduction. The above method is suitable for preparing preforms having a weight in the range of approximately 1 to 5,000 mg and having high weight accuracy.

The separated glass forward end portion is received, for example, with a shaping mold having a concave shaping surface from which gas is ejected, and the glass is floated and turned with the pressure of the gas, to form a preform having the form of a sphere, a spheroid, or the like. The above shaping method will be referred to as "float-shaping method". In the float-shaping method, it is required to satisfy severe conditions of the viscosity of the glass during shaping. When a preform made of the optical glass of the present invention is shaped, the properties of the glass are suitable for the float-shaping method, so that the float shaping can be excellently carried out. The thus-prepared preform may be provided with a mold release film or other film on its surface.

The already described droplet floating method refers to a method in which a molten glass droplet obtained by the dropping method is float-shaped.

The process for producing a precision press-molded article will be explained below.

The precision press-molding process refers to a method in which a re-heated preform is molded under pressure with a mold having a form of a predetermined form, to produce a molded article having the same form as that of an end product or a form very close thereto. According to the above precision press-molding method, an end product, particularly, an end product that is required to have remarkably high form accuracy or surface accuracy can be produced without cutting or polishing the molded article or by only polishing the molded article at a very small removal ratio. The method for the production of a precision press-molded article, provided by the present invention, is suitable for producing various optical parts such as a lens, a lens array, a diffraction grating, a prism, etc., particularly for producing aspherical lenses at high productivity. According to the method for the production of a precision press-molded article, provided by the present invention, not only optical elements having high-refractivity and low-dispersion properties can be produced, but also the glass constituting the preform has a glass transition temperature (Tg) of as low as 600° C. or lower, so that the pressing can be carried out at a relatively low temperature for press-molding of a glass. Therefore, a burden on the molding surface of a pressing mold can be decreased, and a longer lifetime of the mold can be attained. Further, since the glass constituting the preform has high stability, the devitrification of the glass can be effectively prevented even at the steps of re-heating and pressing the glass. Further, a series of the steps starting with the step of melting the glass and ending with the step of obtaining an end product can be efficiently carried out at high productivity.

In the precision press-molding process, a preform having a surface in a clean state is re-heated such that the glass constituting the preform has a viscosity in the range of from $10^5$ to $10^{11}$ Pa·s, and the re-heated preform is press-molded in a mold having an upper mold member and a lower mold member. The molding surface of the mold may be provided with a mold release film as required. The press-molding is preferably carried in a nitrogen gas atmosphere or an inert gas atmosphere for preventing the oxidation of the molding surface of the mold. The press-molded article is taken out of the mold, and is gradually cooled as required. When the molded article is an optical element such as a lens, the surface thereof may be coated with an optical thin film.

In the above manner, a highly accurate optical part made of a high-refractivity and low-dispersion optical glass having a refractive index (nd) of 1.75 to 1.85 and an Abbe's number (vd) of 40 to 55, such as a lens, a lens array, a diffraction grating, a prism, or the like, can be efficiently produced at high yields.

According to the present invention, there is also provided an optical part made of the optical glass I or II of the present invention.

EXAMPLES

The present invention will be more specifically explained with reference to Examples hereinafter, while the present invention shall not be limited by Examples.

Examples 1–47

Oxides, carbonates, sulfates, nitrates, hydroxides, etc., corresponding to glass components were used as glass materials. The glass materials in an amount of 250 to 300 g was weighed to prepare a composition shown in any one of Tables 1 to 8 and fully mixed to prepare a formulated batch. The mixture was placed in a platinum crucible, the crucible was placed in an electric furnace maintained at a temperature of 1,200 to 1,250° C., and while the mixture was stirred, the mixture was melted in air for 2 to 4 hours. After melting, a glass melt was allowed to flow into a 40×70×15 mm mold made of carbon and allowed to cool to a glass transition temperature. Immediately thereafter, the glass was placed in an annealing furnace, annealed in the glass transition temperature range for approximately 1 hour and then allowed to cool in the furnace. The thus-obtained glass had no precipitation of a crystal observable through a microscope.

The thus-obtained glasses had compositions, glass transition temperatures (Tg), sag temperature (Ts), liquidus temperatures (LT), viscosities at liquidus temperatures, refractive indexes (nd) and Abbe's numbers (vd) shown in Tables 1 to 8. The above properties were measured as follows.

(1) Refractive Index (nd) and Abbe's Number (vd)

An optical glass obtained by gradually cooling the glass at a temperature decrease rate of −30° C./h was measured.

(2) Transition Temperature (Tg) and Sag Temperature (Ts)

Measured with a thermo-mechanical analyzer supplied by Rigaku Denki K.K. at a temperature elevation rate of 4° C./minute.

(3) Liquidus Temperature (LT)

A sample was maintained in a devitrification testing furnace having a temperature gradient of from 400 to 1,100° C. for 1 hour, and then observed for a crystal with a microscope of 80 magnifications to measure a liquidus temperature.

(4) Viscosity (ηLT) at Liquidus Temperature

A sample was measured for a viscosity by a viscosity measurement method using a coaxial cylindrical double-tube rotational viscometer according to JIS Z 8803.

As shown in Tables 1 to 8, the glasses have a glass transition temperature (Tg) of 600° C. or lower and a sag temperature (Ts) of 630° C. or lower. Further, they have a liquidus temperature (LT) of 1,030° C. or lower and a viscosity of at least 6 dPa·s at a liquidus temperature.

TABLE 1

| | Examples | | | | | |
|---|---|---|---|---|---|---|
| | 1 | 2 | 3 | 4 | 5 | 6 |
| $B_2O_3$ | 36.80 | 34.65 | 37.10 | 36.80 | 37.10 | 37.70 |
| $SiO_2$ | 12.80 | 15.75 | 12.90 | 12.80 | 12.90 | 13.11 |
| $B_2O_3/SiO_2$ molar ratio | 2.88 | 2.20 | 2.88 | 2.88 | 2.88 | 2.88 |
| $La_2O_3$ | 8.00 | 7.87 | 8.06 | 8.00 | 8.87 | 8.20 |
| $Gd_2O_3$ | 8.00 | 7.87 | 8.06 | 8.00 | 7.26 | 8.20 |
| $La_2O_3 + Gd_2O_3$ | 16.00 | 15.75 | 16.13 | 16.00 | 16.13 | 16.39 |
| ZnO | 22.40 | 22.05 | 22.58 | 22.40 | 22.58 | 19.67 |
| $Li_2O$ | 5.60 | 5.51 | 5.65 | 5.60 | 5.65 | 7.38 |
| $ZnO + Li_2O$ | 28.00 | 27.56 | 28.23 | 28.00 | 28.23 | 27.05 |
| $ZrO_2$ | 4.80 | 4.72 | 3.23 | 3.20 | 3.23 | 3.28 |
| $Ta_2O_5$ | 1.60 | 1.57 | 2.42 | 1.60 | 2.42 | 2.46 |
| $WO_3$ | 0.00 | 0.00 | 0.00 | 1.60 | 0.00 | 0.00 |
| Total | 100.0 | 100.0 | 100.0 | 100.0 | 100.0 | 100.0 |
| Properties | | | | | | |
| Transition temp. (Tg) (° C.) | 563 | 562 | 561 | 560 | 559 | 557 |
| Sag temp. (Ts) (° C.) | 609 | 608 | 607 | 606 | 607 | 603 |
| Liquidus temp. (LT) (° C.) | 1030 | 1030 | 1020 | 990 | 1000 | 1020 |
| Viscosity* (dPa · s) | 6 | 6 | 7 | 11 | 11 | 7 |
| Refractive Index (nd) | 1.77364 | 1.77054 | 1.77437 | 1.77397 | 1.77521 | 1.77141 |
| Abbe number (vd) | 47.25 | 47.27 | 46.90 | 46.34 | 46.81 | 47.15 |

*Viscosity at Liquidus temp.

TABLE 2

| | Examples | | | | | |
|---|---|---|---|---|---|---|
| | 7 | 8 | 9 | 10 | 11 | 12 |
| $B_2O_3$ | 37.40 | 36.80 | 37.10 | 36.51 | 36.22 | 37.40 |
| $SiO_2$ | 13.01 | 12.80 | 12.90 | 12.70 | 12.60 | 13.01 |
| $B_2O_3/SiO_2$ molar ratio | 2.88 | 2.88 | 2.88 | 2.88 | 2.88 | 2.88 |
| $La_2O_3$ | 8.13 | 8.80 | 8.87 | 8.73 | 8.66 | 8.94 |
| $Gd_2O_3$ | 8.13 | 7.20 | 7.26 | 7.14 | 7.09 | 7.32 |
| $La_2O_3 + Gd_2O_3$ | 16.26 | 16.00 | 16.13 | 15.87 | 15.75 | 16.26 |
| ZnO | 19.51 | 22.40 | 20.97 | 22.22 | 22.05 | 21.14 |
| $Li_2O$ | 7.32 | 5.60 | 6.45 | 5.56 | 5.51 | 6.50 |
| $ZnO + Li_2O$ | 26.83 | 28.00 | 27.42 | 27.78 | 27.56 | 27.64 |
| $ZrO_2$ | 3.25 | 3.20 | 4.84 | 6.35 | 6.30 | 3.25 |
| $Ta_2O_5$ | 1.63 | 1.60 | 1.61 | 0.79 | 0.00 | 2.44 |
| $WO_3$ | 1.63 | 1.60 | 0.00 | 0.00 | 1.57 | 0.00 |
| Total | 100.0 | 100.0 | 100.0 | 100.0 | 100.0 | 100.0 |

TABLE 2-continued

|  | Examples | | | | | |
| --- | --- | --- | --- | --- | --- | --- |
|  | 7 | 8 | 9 | 10 | 11 | 12 |
| Properties | | | | | | |
| Transition temp. (Tg) (° C.) | 556 | 559 | 557 | 558 | 557 | 557 |
| Sag temp. (Ts) (° C.) | 602 | 604 | 603 | 604 | 603 | 603 |
| Liquidus temp. (LT) (° C.) | 990 | 990 | 1020 | 1030 | 1030 | 1000 |
| Viscosity* (dPa · s) | 11 | 11 | 7 | 6 | 6 | 10 |
| Refractive Index (nd) | 1.77109 | 1.77478 | 1.77291 | 1.77331 | 1.77304 | 1.77382 |
| Abbe number (νd) | 46.56 | 46.28 | 47.30 | 47.50 | 46.93 | 46.89 |

*Viscosity at Liquidus temp.

TABLE 3

|  | Examples | | | | | |
| --- | --- | --- | --- | --- | --- | --- |
|  | 13 | 14 | 15 | 16 | 17 | 18 |
| $B_2O_3$ | 37.70 | 38.02 | 37.10 | 37.10 | 37.10 | 38.21 |
| $SiO_2$ | 13.11 | 13.22 | 12.90 | 12.90 | 12.90 | 11.38 |
| $B_2O_3/SiO_2$ molar ratio | 2.88 | 2.88 | 2.88 | 2.88 | 2.88 | 3.36 |
| $La_2O_3$ | 9.02 | 9.09 | 9.68 | 10.48 | 11.29 | 8.94 |
| $Gd_2O_3$ | 7.38 | 7.44 | 6.45 | 5.65 | 4.84 | 7.32 |
| $La_2O_3 + Gd_2O_3$ | 16.39 | 16.53 | 16.13 | 16.13 | 16.13 | 16.26 |
| ZnO | 19.67 | 18.18 | 22.58 | 22.58 | 22.58 | 22.76 |
| $Li_2O$ | 7.38 | 8.26 | 5.65 | 5.65 | 5.65 | 5.69 |
| $ZnO + Li_2O$ | 27.05 | 26.45 | 28.23 | 28.23 | 28.23 | 28.46 |
| $ZrO_2$ | 3.28 | 3.31 | 3.23 | 3.23 | 3.23 | 3.25 |
| $Ta_2O_5$ | 2.46 | 2.48 | 2.42 | 2.42 | 2.42 | 2.44 |
| $WO_3$ | 0.00 | 0.00 | 0.00 | 0.00 | 0.00 | 0.00 |
| Total | 100.0 | 100.0 | 100.0 | 100.0 | 100.0 | 100.0 |
| Properties | | | | | | |
| Transition temp. (Tg) (° C.) | 555 | 550 | 560 | 558 | 556 | 559 |
| Sag temp. (Ts) (° C.) | 601 | 596 | 606 | 604 | 602 | 605 |
| Liquidus temp. (LT) (° C.) | 1010 | 1020 | 1000 | 1000 | 1010 | 1020 |
| Viscosity* (dPa · s) | 10 | 6 | 10 | 10 | 8 | 7 |
| Refractive Index (nd) | 1.77225 | 1.77071 | 1.77627 | 1.77676 | 1.77713 | 1.77711 |
| Abbe number (νd) | 47.11 | 47.25 | 46.70 | 46.70 | 46.64 | 46.84 |

*Viscosity at Liquidus temp.

TABLE 4

|  | Examples | | | | | |
| --- | --- | --- | --- | --- | --- | --- |
|  | 19 | 20 | 21 | 22 | 23 | 24 |
| $B_2O_3$ | 39.34 | 40.50 | 38.21 | 39.34 | 40.50 | 37.90 |
| $SiO_2$ | 9.84 | 8.26 | 13.01 | 13.11 | 13.22 | 12.90 |
| $B_2O_3/SiO_2$ molar ratio | 4.00 | 4.90 | 2.94 | 3.00 | 3.06 | 2.94 |
| $La_2O_3$ | 9.02 | 9.09 | 8.94 | 9.02 | 9.09 | 8.87 |
| $Gd_2O_3$ | 7.38 | 7.44 | 7.32 | 7.38 | 7.44 | 7.26 |
| $La_2O_3 + Gd_2O_3$ | 16.39 | 16.53 | 16.26 | 16.39 | 16.53 | 16.13 |
| ZnO | 22.95 | 23.14 | 21.14 | 19.67 | 18.18 | 22.58 |
| $Li_2O$ | 5.74 | 5.79 | 5.69 | 5.74 | 5.79 | 4.84 |
| $ZnO + Li_2O$ | 28.69 | 28.93 | 26.83 | 25.41 | 23.97 | 27.42 |
| $ZrO_2$ | 3.28 | 3.31 | 3.25 | 3.28 | 3.31 | 3.23 |
| $Ta_2O_5$ | 2.46 | 2.48 | 2.44 | 2.46 | 2.48 | 2.42 |
| $WO_3$ | 0.00 | 0.00 | 0.00 | 0.00 | 0.00 | 0.00 |
| Total | 100.0 | 100.0 | 100.0 | 100.0 | 100.0 | 100.0 |
| Properties | | | | | | |
| Transition temp. (Tg) (° C.) | 558 | 556 | 562 | 567 | 571 | 563 |
| Sag temp. (Ts) (° C.) | 604 | 602 | 608 | 613 | 617 | 609 |
| Liquidus temp. (LT) (° C.) | 1020 | 1020 | 1000 | 1000 | 1000 | 1000 |
| Viscosity* (dPa · s) | 7 | 7 | 9 | 10 | 10 | 10 |
| Refractive Index (nd) | 1.77773 | 1.77900 | 1.77289 | 1.77039 | 1.76777 | 1.77429 |
| Abbe number (νd) | 46.87 | 46.81 | 46.98 | 47.23 | 47.45 | 47.01 |

*Viscosity at Liquidus temp.

TABLE 5

|  | Examples | | | | | |
| --- | --- | --- | --- | --- | --- | --- |
|  | 25 | 26 | 27 | 28 | 29 | 30 |
| $B_2O_3$ | 38.71 | 39.52 | 37.40 | 37.10 | 37.40 | 37.10 |
| $SiO_2$ | 12.90 | 12.90 | 13.01 | 12.90 | 13.01 | 12.90 |
| $B_2O_3/SiO_2$ molar ratio | 3.00 | 3.06 | 2.88 | 2.88 | 2.88 | 2.88 |
| $La_2O_3$ | 8.87 | 8.87 | 9.76 | 9.68 | 9.76 | 9.68 |
| $Gd_2O_3$ | 7.26 | 7.26 | 7.32 | 7.26 | 7.32 | 7.26 |
| $La_2O_3 + Gd_2O_3$ | 16.13 | 16.13 | 17.07 | 16.94 | 17.07 | 16.94 |
| ZnO | 22.58 | 22.58 | 21.14 | 22.58 | 22.76 | 22.58 |
| $Li_2O$ | 4.03 | 3.23 | 5.69 | 4.84 | 5.69 | 5.65 |
| $ZnO + Li_2O$ | 26.61 | 25.81 | 26.83 | 27.42 | 28.46 | 28.23 |
| $ZrO_2$ | 3.23 | 3.23 | 3.25 | 3.23 | 1.63 | 3.23 |
| $Ta_2O_5$ | 2.42 | 2.42 | 2.44 | 2.42 | 2.44 | 1.61 |
| $WO_3$ | 0.00 | 0.00 | 0.00 | 0.00 | 0.00 | 0.00 |
| Total | 100.0 | 100.0 | 100.0 | 100.0 | 100.0 | 100.0 |
| Properties |  |  |  |  |  |  |
| Transition temp. (Tg) (° C.) | 575 | 582 | 564 | 565 | 558 | 560 |
| Sag temp. (Ts) (° C.) | 621 | 628 | 610 | 611 | 604 | 606 |
| Liquidus temp. (LT) (° C.) | 1000 | 980 | 1010 | 1010 | 1010 | 1010 |
| Viscosity* (dPa · s) | 10 | 12 | 8 | 8 | 8 | 8 |
| Refractive Index (nd) | 1.77301 | 1.77172 | 1.77973 | 1.78131 | 1.77501 | 1.77286 |
| Abbe number (vd) | 47.02 | 47.17 | 46.77 | 46.64 | 47.08 | 47.53 |

*Viscosity at Liquidus temp.

TABLE 6

|  | Examples | | | | | |
| --- | --- | --- | --- | --- | --- | --- |
|  | 31 | 32 | 33 | 34 | 35 | 36 |
| $B_2O_3$ | 36.29 | 37.40 | 36.92 | 37.10 | 37.70 | 39.51 |
| $SiO_2$ | 12.90 | 11.38 | 12.84 | 12.90 | 13.11 | 13.17 |
| $B_2O_3/SiO_2$ molar ratio | 2.81 | 3.29 | 2.88 | 2.88 | 2.88 | 3.00 |
| $La_2O_3$ | 9.68 | 9.76 | 8.83 | 9.19 | 9.43 | 9.88 |
| $Gd_2O_3$ | 7.26 | 7.32 | 7.22 | 7.26 | 7.38 | 7.41 |
| $La_2O_3 + Gd_2O_3$ | 16.94 | 17.07 | 16.05 | 16.45 | 16.80 | 17.28 |
| ZnO | 22.58 | 22.76 | 22.47 | 22.58 | 19.67 | 19.75 |
| $Li_2O$ | 5.65 | 5.69 | 5.62 | 5.65 | 6.97 | 5.76 |
| $ZnO + Li_2O$ | 28.23 | 28.46 | 28.09 | 28.23 | 26.64 | 25.51 |
| $ZrO_2$ | 3.23 | 3.25 | 4.17 | 3.23 | 3.28 | 2.47 |
| $Ta_2O_5$ | 2.42 | 2.44 | 1.93 | 2.10 | 2.46 | 2.06 |
| $WO_3$ | 0.00 | 0.00 | 0.00 | 0.00 | 0.00 | 0.00 |
| Total | 100.0 | 100.0 | 100.0 | 100.0 | 100.0 | 100.0 |
| Properties |  |  |  |  |  |  |
| Transition temp. (Tg) (° C.) | 559 | 559 | 562 | 562 | 561 | 570 |
| Sag temp. (Ts) (° C.) | 605 | 605 | 606 | 605 | 603 | 616 |
| Liquidus temp. (LT) (° C.) | 1010 | 1010 | 1000 | 1000 | 1010 | 1000 |
| Viscosity* (dPa · s) | 7 | 8 | 10 | 10 | 8 | 10 |
| Refractive Index (nd) | 1.78116 | 1.78253 | 1.77435 | 1.77412 | 1.77452 | 1.76861 |
| Abbe number (vd) | 46.60 | 46.52 | 47.01 | 47.08 | 46.96 | 47.94 |

*Viscosity at Liquidus temp.

TABLE 7

|  | Examples | | | | | | |
| --- | --- | --- | --- | --- | --- | --- | --- |
|  | 37 | 38 | 39 | 40 | 41 | 42 | 43 |
| $B_2O_3$ | 36.59 | 38.21 | 39.22 | 40.94 | 39.92 | 34.65 | 42.62 |
| $SiO_2$ | 14.63 | 13.82 | 11.44 | 9.93 | 9.88 | 15.75 | 7.89 |
| $B_2O_3/SiO_2$ molar ratio | 2.50 | 2.76 | 3.43 | 4.13 | 4.04 | 2.20 | 5.40 |
| $La_2O_3$ | 9.76 | 8.94 | 9.15 | 9.26 | 9.30 | 7.87 | 8.56 |
| $Gd_2O_3$ | 6.50 | 7.32 | 7.35 | 7.44 | 7.57 | 7.87 | 8.39 |
| $La_2O_3 + Gd_2O_3$ | 16.26 | 16.26 | 16.50 | 16.71 | 16.87 | 15.75 | 16.95 |
| ZnO | 19.51 | 20.33 | 21.24 | 20.68 | 21.40 | 22.05 | 20.97 |
| $Li_2O$ | 7.32 | 5.69 | 5.72 | 5.79 | 5.76 | 5.51 | 5.87 |
| $ZnO + Li_2O$ | 26.83 | 26.02 | 26.96 | 26.47 | 27.16 | 27.56 | 26.85 |
| $ZrO_2$ | 3.25 | 3.25 | 3.92 | 3.97 | 4.12 | 4.72 | 3.36 |
| $Ta_2O_5$ | 2.44 | 2.44 | 1.96 | 1.99 | 2.06 | 1.57 | 2.35 |

TABLE 7-continued

|  | Examples | | | | | | |
| --- | --- | --- | --- | --- | --- | --- | --- |
|  | 37 | 38 | 39 | 40 | 41 | 42 | 43 |
| $WO_3$ | 0.00 | 0.00 | 0.00 | 0.00 | 0.00 | 0.00 | 0.00 |
| Total | 100.0 | 100.0 | 100.0 | 100.0 | 100.0 | 100.0 | 100.0 |
| Properties |  |  |  |  |  |  |  |
| Transition temp. (Tg) (° C.) | 556 | 568 | 562 | 562 | 560 | 562 | 561 |
| Sag temp. (Ts) (° C.) | 601 | 611 | 608 | 605 | 604 | 608 | 606 |
| Liquidus temp. (LT) (° C.) | 1000 | 1000 | 990 | 990 | 990 | 1030 | 1000 |
| Viscosity* (dPa · s) | 10 | 10 | 10 | 10 | 10 | 6 | 8 |
| Refractive Index (nd) | 1.77138 | 1.77055 | 1.77330 | 1.77310 | 1.77727 | 1.77054 | 1.77480 |
| Abbe number (νd) | 47.06 | 47.30 | 47.38 | 47.48 | 47.07 | 47.27 | 47.33 |

*Viscosity at Liquidus temp.

TABLE 8

|  | Examples | | | |
| --- | --- | --- | --- | --- |
|  | 44 | 45 | 46 | 47 |
| $B_2O_3$ | 40.94 | 41.19 | 38.59 | 39.87 |
| $SiO_2$ | 9.93 | 9.88 | 13.08 | 11.48 |
| $B_2O_3/SiO_2$ molar ratio | 4.12 | 4.17 | 2.95 | 3.47 |
| $La_2O_3$ | 9.26 | 9.23 | 9.81 | 9.52 |
| $Gd_2O_3$ | 7.44 | 7.41 | 7.36 | 7.39 |
| $La_2O_3 + Gd_2O_3$ | 16.70 | 16.64 | 17.17 | 16.91 |
| ZnO | 20.68 | 21.42 | 18.81 | 20.12 |
| $Li_2O$ | 5.79 | 4.94 | 6.13 | 5.54 |
| $ZnO + Li_2O$ | 26.47 | 26.36 | 24.94 | 25.66 |
| $ZrO_2$ | 3.97 | 3.95 | 4.09 | 4.02 |
| $Ta_2O_5$ | 1.99 | 1.98 | 1.64 | 1.81 |
| $WO_3$ | 0.00 | 0.00 | 0.49 | 0.25 |
| Total | 100.0 | 100.0 | 100.0 | 100.0 |
| Properties |  |  |  |  |
| Transition temp. (Tg) (° C.) | 562 | 570 | 568 | 569 |
| Sag temp. (Ts) (° C.) | 605 | 615 | 616 | 615 |
| Liquidus temp. (LT) (° C.) | 990 | 970 | 990 | 980 |
| Viscosity* (dPa · s) | 10 | 15 | 13 | 14 |
| Refractive Index (nd) | 1.77300 | 1.77300 | 1.77349 | 1.77325 |
| Abbe number (νd) | 47.50 | 47.36 | 47.30 | 47.33 |

*Viscosity at Liquidus temp.

Comparative Examples 1 and 2

Optical glasses having compositions shown in Table 9 were prepared, and measured for properties, in the same manner as in Examples 1 to 47. Table 9 shows the results. It is seen that the viscosity of the glass at a liquidus temperature in each Comparative Example is smaller than the temperature range suitable for hot-shaping of a preform.

TABLE 9

|  | Comparative Examples | |
| --- | --- | --- |
|  | 1 | 2 |
| $B_2O_3$ | 29.44 | 38.71 |
| $SiO_2$ | 16.36 | 6.45 |
| $B_2O_3/SiO_2$ molar ratio | 1.80 | 6.00 |
| $La_2O_3$ | 7.63 | 8.06 |
| $Gd_2O_3$ | 7.63 | 6.45 |
| $La_2O_3 + Gd_2O_3$ | 15.27 | 14.52 |
| ZnO | 27.48 | 25.81 |
| $Li_2O$ | 3.82 | 7.26 |
| $ZnO + Li_2O$ | 31.30 | 33.06 |
| $ZrO_2$ | 4.58 | 6.45 |
| $Ta_2O_5$ | 3.05 | 0.81 |
| $WO_3$ | 0.00 | 0.00 |
| Total | 100.0 | 100.0 |
| Properties |  |  |
| Transition temp. (Tg) (° C.) | 570 | 530 |
| Sag temp. (Ts) (° C.) | 606 | 565 |
| Liquidus temp. (LT) (° C.) | 1100 | 1060 |
| Viscosity* (dPa·s) | 1 | 2 |
| Refractive Index (nd) | 1.79514 | 1.77362 |
| Abbe number (νd) | 45.04 | 47.11 |

*Viscosity at Liquidus temp.

Example 48

A clarified and homogenized molten glass obtained from any one of optical glasses shown in Tables 1 to 8 was allowed to flow out of a flow pipe made of platinum, to hot-shape a preform. The preform was aspherical-precision press-molded with a precision press-molding apparatus shown in FIG. 1, to form an aspherical lens.

Figure 1:
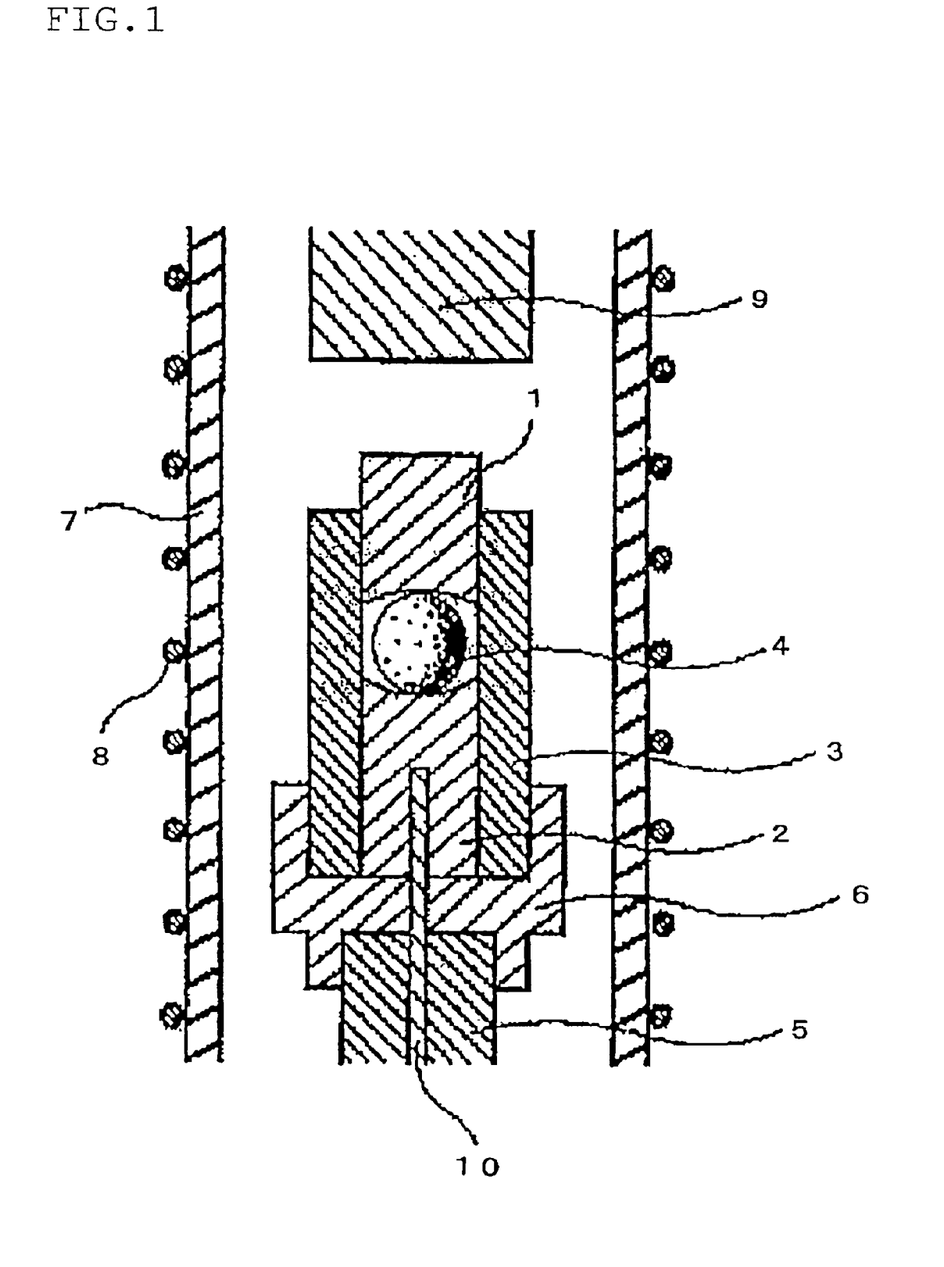
FIG. 1 is a schematic cross-sectional view of one example of a precision press-molding apparatus used in Examples.

First, the glass in any one of Examples 1 to 47 was prepared into a gob preform having a diameter of 2 to 30 mm with a hot preform float shaping apparatus. In this case, the glass had a sufficient viscosity, so that a gob preform having excellent weight accuracy and form accuracy was obtained. Then, the thus-obtained gob preform 4 was placed between a lower mold member 2 and an upper mold member 1 having an aspherical form. Then, a nitrogen gas was introduced in a quartz tube 7, and a heater 8 was electrically switched on to heat an inside of the quartz tube 7. The temperature inside a mold was set at a temperature higher than a glass transition temperature by +20 to 60° C., and while the above temperature was maintained, a pressing rod 9 was moved downward to press the upper mold member 1, thereby to press-mold the gob preform 4. The pressing was carried out at a molding pressure of 8 MPa for a molding time period of 30 seconds. Then, the molding pressure was decreased, and a glass molded article obtained by the aspherical press molding was gradually cooled to a temperature lower than the glass transition temperature by −30° C. while the molded article was in contact with the lower mold member 2 and the upper mold member 1. Then, the molded article was rapidly cooled to room temperature. Then, the glass molded in the form of an aspherical lens was taken out of the mold, and measured for a form, and its appearance was inspected. The thus-obtained aspherical lenses had remarkably high accuracy.

In FIG. 1, reference numeral 3 shows a guide mold member (sleeve), reference numeral 5 shows a support rod, reference numeral 6 shows a support bed, and reference numeral 10 shows a thermocouple.

EFFECT OF THE INVENTION

According to the present invention, there can be provided an optical glass that is excellent in high-temperature shapability and precision press moldability and has high-refractivity high-dispersion properties.

According to the present invention, further, a preform for press-molding is constituted of the above optical glass, so that there can be provided a preform for press-molding, which is suitable for precision press-molding.

According to the present invention, further, a molten glass is hot-shaped that can give the above optical glass which exhibits a predetermined viscosity at the liquidus temperature thereof, so that a method for efficiently preparing preforms for press-molding at high productivity can be provided.

Further, according to the present invention, the above preform for press-molding is re-heated and precision press-molded, so that there can be provided a process for producing a press-molded article having high accuracy, such as an optical part.

What is claimed is:

1. An optical glass comprising, as essential components, 25 to 45 mol % of $B_2O_3$, 0.5 to 20 mol % of $SiO_2$, 5 to 22 mol % of $La_2O_3$, 2 to 20 mol % of $Gd_2O_3$, 15 to 29 mol % of ZnO, 1 to 10 mol % of $Li_2O$ and 0.5 to 8 mol % of $ZrO_2$, as optional components, 0 to 8 mol % of $Ta_2O_5$, 0 to 8 mol % of $WO_3$, 0 to 8 mol % of $Nb_2O_5$, 0 to 8 mol % of $Y_2O_3$, 0 to 8 mol % of $Yb_2O_3$ and, as an anti-foaming agent, 0 to 1 mol % of $Sb_2O_3$, the essential components and the optional components having a total content of at least 95 mol %;

the optical glass having a $B_2O_3/SiO_2$ molar ratio of from 2 to 5.5 and having an $La_2O_3$ and $Gd_2O_3$ total content of 12 to 24 mol % and a ZnO and $Li_2O$ total content of 25 to 30 mol %, the optical glass having a refractive index (nd) of 1.75 to 1.85 and an Abbe's number (vd) of 40 to 55.

2. The optical glass of claim 1, which has a viscosity of at least 6 dPa·s at a liquidus temperature thereof.

3. The optical glass according to claim 1, which has a glass transition temperature (Tg) of 600° C. or lower.

4. A preform for press-molding, which is a preform for press-molding by heating and softening and is formed of the optical glass recited in claim 1.

5. A method for the preparation of a preform for press-molding by heating and softening, which comprises flowing out of a flow pipe, a predetermined amount of a molten glass of the optical glass recited in claim 1, shaping the molten glass in a softened state to the form of a preform, and cooling the shaped glass.

6. An optical part made of the optical glass recited in claim 1.

7. A process for the production of an optical part, which comprises heating, softening and precision press-molding the preform recited in claim 4.

8. The optical glass according to claim 1, further containing 1 mol % or less $Sb_2O_3$ as an anti-foaming agent.

* * * * *